Oct. 19, 1954  R. L. LONGINI  2,692,299
IMAGE CONTRAST INTENSIFIER
Filed Dec. 11, 1948
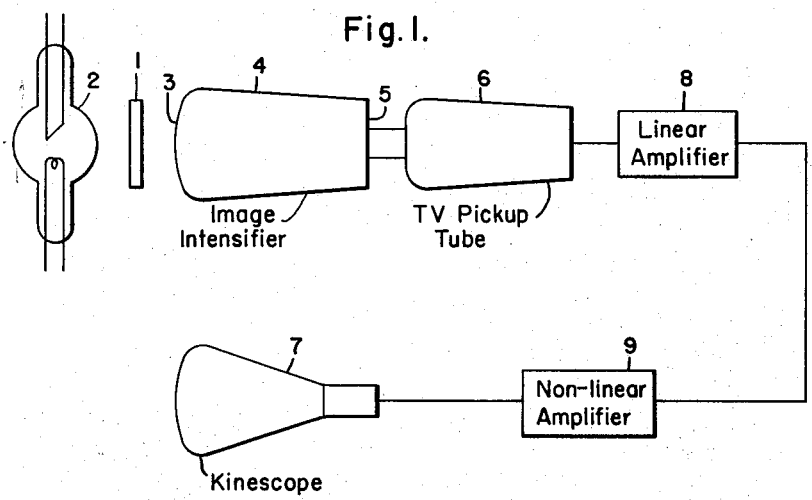
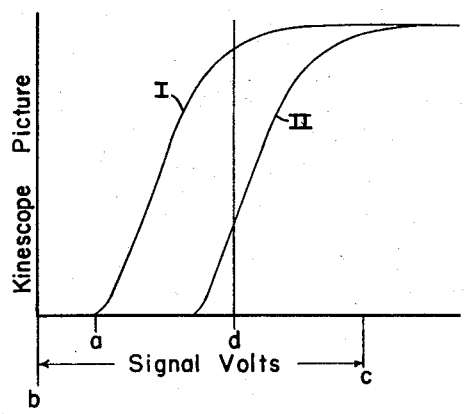
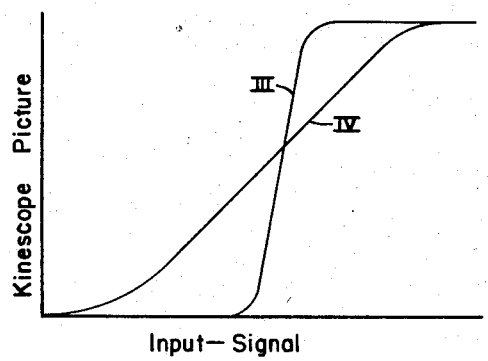
WITNESSES:
Edward Michaels
Nw. C. Groome
INVENTOR
Richard L. Longini.
BY
F. W. Lyle.
ATTORNEY Patented Oct. 19, 1954

2,692,299

UNITED STATES PATENT OFFICE 2,692,299

IMAGE CONTRAST INTENSIFIER

Richard L. Longini, Pittsburgh, Pa., assignor to Westinghouse Electric Corporation, East Pittsburgh, Pa., a corporation of Pennsylvania Application December 11, 1948, Serial No. 64,811

5 Claims. (Cl. 178—6.8)

My invention relates to optical image devices and in particular relates to an arrangement for increasing the contrast between light and dark portions of such images. One promising field for use of my arrangement is in reproducing optical images of fluorescent screen pictures in such a way as to increase the contrast between areas thereon which have different light intensities. I illustrate the arrangements of the foregoing sort in connection with increasing contrasts between various portions of fluorescent images on the screens of X-ray equipments.

In following my purposes in X-radiography, particularly in the medical field, it is desirable instantaneously to obtain images in which movement of the objects can be watched continuously and in such cases still photographs or even motion pictures are in many cases unsatisfactory and inadequate. Hence, production of images on fluorescent screens is resorted to. However, the brightness of such images is extremely low so that they can only be viewed in dark rooms and after the observer has conditioned his eyes by a wait of the order of one-half hour before viewing the screen. The hardship and loss of time incident to this situation need no comment and to avoid this difficulty the research laboratories of applicant's assignee have developed a device known as an image intensifier which is described and claimed in application Serial No. 771,112, filed August 28, 1948, by R. L. Longini and Lloyd P. Hunter, now Patent No. 2,555,545 issued August 28, 1948. This image intensifier may be briefly described as an arrangement in which the image produced on a fluorescent screen by the X-ray apparatus is projected onto an adjacent photoelectric screen to produce an electron image which is a replica of the optical image. An electron lens system then accelerates the electron image and at the same time shrinks its dimensions causing the electrons to impinge on a phosphor screen on which is produced a condensed, but greatly intensified replica of the original optical image. This condensed image may then be viewed by any suitable optical system and appears to the observer's eye as a reproduction of the original optical image but with a brightness some 500 fold greater.

In viewing any such optical image the ability to distinguish details of the view is largely dependent upon the contrasts between them. For instance, two parallel lines can be resolved only if they differ from their backgrounds sufficiently in intensity. In accordance with the principles of my invention, I make it possible to distinguish various portions of the picture from each other by emphasizing the contrast between them while leaving substantially untouched or even decreasing the relative intensities of other portions or objects in the picture which are not of interest to the observer at the moment. By the arrangement which I am about to describe, it is, for example, possible to render more readily distinguishable portions of a picture which have light intensities respectively of 2 and 3 units, let us say, while leaving unemphasized other portions of the view having other intensities. I also provide means by which the particular light intensities in which the contrast is augmented may be selected at will; so that, for example, the areas of intensities 2 and 3 units may first be emphasized and by simple manual regulation by the observer the emphasized intensities may be changed to 3 units and 4 units, or 4 units and 5 units, etc. By the foregoing means, it is possible, in a practical case, to emphasize and make prominent one pair of organs in the human body at first in the course of observation; then to bring out clearly and emphasize another pair of organs and so on at will. It is obvious that this ability to emphasize any desired portion of an optical image at will is of great importance in many lines of work.

One object of my invention is, accordingly, to provide a method of reproducing optical images in which the contrast between certain portions of the image are increased over their values in the original.

Another object of my invention is to produce an improved arrangement for reproducing optical images to emphasize and clarify the outlines of certain portions of the original image.

Another object of my invention is to provide an improved method and apparatus for reproducing optical images.

Still another object of my invention is to provide an improved image intensifier in which the relative increase in intensity of various portions of the image may be controlled at will.

Still another object of my invention is to produce an improved apparatus for reproducing the images on fluorescent screens.

A further object of my invention is to provide an improved form of radiographic apparatus for medical work in which an observer may bring out by contrast the various internal structures of the body being viewed.

Other objects of my invention will become apparent upon reading the following description taken in connection with the drawing, in which:

Fig. 1 is a block diagram illustrating the principal components of an apparatus in which the principles of my invention may be employed;

Fig. 2 is a graph showing the relationship between certain characteristic quantities attributable to one electrical amplifier employed in carrying out the principles of my invention; and Fig. 3 is a graph showing a similar relationship for another amplifier also employed therein.

It should be recognized that while Figs. 1 and 2 show one particular embodiment of the broader principles of my invention, the latter is not limited to this particular embodiment and the latter is shown merely as one form of apparatus in which these principles may be embodied.

Turning in detail to Fig. 1, an X-ray image of a body 1 which it is desired to view may be produced by projection of X-rays from a suitable source 2 onto a fluorescent screen 3 formed on the one end of an image intensifier 4 of the general type described and claimed in the above-mentioned Hunter and Longini application. Briefly, the fluorescent screen formed on one end of the image intensifier 4 is mounted closely adjacent a screen of photoelectrical emissive material and the latter is thereby caused to emit into the space within the container 4 a cloud of electrons which vary in intensity, point by point over a plane through the electron trajectories in exact correspondence with the light intensities of various points on the fluorescent screen. This cloud of electrons may be considered to form an electron image, and the electrons are accelerated through a suitable electron lens system such as that described in the aforesaid application and caused to form a light image of reduced dimensions but greatly enhanced intensity on the phosphor screen 5 at the upper end of the image intensifier 4. The optical image or screen 5 is projected on the photo-sensitive screen of a television pickup tube 6 which may, for example, be of the image orthicon type now being used in the television art. However, it is not essential to the purposes of my invention that the television pickup tube shall be of the image orthicon type but it may for example be one of the pickup tubes described in chapter 11 of the book "Television" by Zworykin and Morton, published by Wiley & Sons, New York, 1940.

While I have stated that the optical image produced on the screen 5 is projected onto the photo-sensitive screen of the television pickup tube, and this projection may be carried out if the image intensifier tube and pickup tube are separate structures by means of some suitable optical system such as the Schmidt lens systems now well known in astronomical and other work, it is possible to incorporate the image intensifier and television pickup tubes in a single structure in which the phosphor screen 5 is formed on one surface of a thin glass plate or partition while the photo-sensitive surface is formed on the other side thereof.

As is well known in the art, television pickup tubes of the type I have described cause an electron beam to scan a screen and thereby produce in an output circuit for the pickup tube a signal current which varies in intensity from instant to instant as the electron beam scans it in correspondence with the variations point by point in the light image projected on the screen. In ordinary television systems this output current is transmitted to a receiving station and modulates the intensity of an electron beam which scans a fluorescent screen in synchronism with the electron beam at the transmitter thereby reproducing on such screen the picture which was projected onto the photo-sensitive screen of the pickup tube.

In my arrangement herein described I likewise transmit the output current of the television pickup tube to a receiving tube or kinescope 7 of a type well known in the television art and cause it to produce an image on the screen thereof. While this receiving kinescope 7 may, in my invention, be located at any desired distance from the pickup tube and hence furnishes an arrangement by which X-ray pictures taken at one place may be reproduced at any other desired place or places, it will often be sufficient to locate the kinescope closely adjacent the image intensifier tube in such a position that an observer who is within easy arms reach of the object 1 being X-rayed can observe the picture on the kinescope screen. For example, the kinescope 7 might be positioned with its axis at right angles with that of the image-intensifier 4 to facilitate the work of the observer in certain instances as described in my application Serial No. 38,586, filed July 14, 1948, for an Optical System for X-Ray Screen Image Intensifier, now Patent No. 2,631,244. In such cases, a simple line wire circuit will interconnect the television pickup tube and the kinescope.

In accordance with my invention, I insert in the circuit connecting the output of the pickup with the input of the kinescope a linear amplifier 8; that is to say an amplifier in which the output voltage is, for any one setting of its gain control, a constant multiple of the input voltage for all values of the output current of the pickup tube 6. I provide the amplifier 8, however, with means by which its gain can be adjusted through a considerable range. In the following discussion I will assume that the circuits are so poled that larger input voltages impressed on the amplifiers result in brighter image-areas on the kinescope 7.

In addition to the linear amplifier 8, I likewise insert in the line between pickup tube 6 and kinescope 7 a non-linear amplifier 9; that is to say, I insert an amplifier in which the output voltage does not bear a constant ratio to the input voltage regardless of the value of the latter. Such non-linear amplifiers are well known in the radio art, for example, amplifiers commonly referred to as type C may be employed for this purpose. In Figs. 2 and 3 I show the input-output characteristics of such an amplifier for various adjustments of bias voltages, the abscissa representing the strength of the input signal or voltage impressed on amplifier 8 by pickup tube 6 and the ordinate representing the strength of the output current or voltage which is supplied to the kinescope 7. In ways well known to the art I design the amplifier 9 so that for signal voltages below a value such as ($a$) in Fig. 2, no output current or voltage is impressed on the kinescope 7. As the signal voltage is increased above the value ($a$) the output voltage impressed on the kinescope 7 rises, being substantially linear over a certain range. However, saturation occurs in such amplifiers and eventually a value ($d$) is reached beyond which the output current and voltage increase at only a slow rate with further increase of the signal intensity.

I so proportion the amplifier 9 that the signal voltage impressed on its input by the linear amplifier 8 covers a range between the points $b$ and $c$ on the Fig. 2 curve. The result of this arrangement is that areas in the image produced on the screen 5 which are below a certain predetermined intensity (a) will be reproduced as a dark region on the screen of the kinescope 7. Likewise, areas of high intensity in the image or screen 5 will be reproduced on the screen or kinescope 7 as all of substantially equal intensity because they will produce signal voltages lying in the range d—c in Fig. 2; but areas on the image on screen 5 which are of intensities intermediate between the low and high values just mentioned will produce in the output of amplifier 9 signal voltages of values lying between (a) and (d) in Fig. 2 and their variations in intensity will show large contrasts in the image produced on the screen of kinescope 7. The result of this arrangement is therefore that a high degree of contrast is produced in the image on the screen of kinescope 7 in the case of light areas within a certain range of intensity in the image produced on screen 5, and organs or other objects represented by these light areas are emphasized and contrasted; but areas of both smaller light intensity and greater light intensity in the image on screen 5 are robbed of contrast and deemphasized in the picture appearing on the screen of kinescope 7.

The particular intensity of light on the screen 5 which corresponds to signal volts having the values (a), (b) and (d) in the output of non-linear amplifier 9 can be varied at will over a considerable range by manual regulation of the bias on amplifier 9 and the gain in amplifier 8 in ways well known in the radio art. Hence, it is possible for an observer to first increase the contrast with other areas on the screen of kinescope 7 for light areas in screen 5 which are of one intensity and then, by regulating the bias in linear amplifier 9, to increase the contrast for light areas of another intensity. This would for instance be represented by change from operating on the curve I to operating on the curve II in Fig. 2. In the case of medical radiography this obviously permits an observer to emphasize and contrast various sets of organs and parts at will.

Again it may be imperative for the observer to distinguish between two particular organs which produce images only slightly different in intensity, even though to do so it becomes impossible to distinguish images of organs producing other intensities from each other. This may be done by adjusting the gain of linear amplifier 8 to a high value so as to cause operation represented by the characteristic curve III instead of curve IV in Fig. 3.

To illustrate another advantage obtainable through the use of the above-described system mention will be made of a practice, now conventional in X-radiography, of using what is called a Bucky grid in taking photographic exposures. In ordinary radiography there is a certain amount of scattered or secondary X-radiation emanating from objects surrounding the normal path of the X-ray and this secondary radiation is more or less uniform in incidence over the film and thereby tends to reduce contrasts on the latter between portions of the normal X-ray stream which respectively travel transparent and opaque portions of the object being viewed. The Bucky grid is a device for cutting out a large portion of this scattered radiation and comprises essentially parallel plates of lead foil positioned so that the X-ray stream projected from the anti-cathode passes through the spaces parallel to the faces of the lead plates traversing the object undergoing radiation and striking the recording film. However, scattered radiation, not being parallel to the radiation projected from the anti-cathode, is directed at an angle to the faces of the lead plates and so cannot traverse the narrow spaces between them but instead strikes them and is absorbed.

The arrangement of television tubes and amplifiers which I have described makes it possible to dispense with the Bucky grid entirely since the effect of the low intensity stray radiation may be prevented from producing any output voltage in the amplifier 9 by confining it to signal values to the left of the point (a) in Fig. 2. This stray radiation therefore produces no effect on the screen of the kinescope 7 and produces no fogging in the picture thereon.

I have described an arrangement embodying the principles of my invention in connection with the image intensifier 4 which is of great value in raising the signal-to-noise ratio in the pickup tube 6 high enough for satisfactory operation of that tube. However, it will be recognized that in certain situations the image on the fluorescent screen 1 may be sufficiently bright for the desired purposes if projected directly on the screen of the television pickup tube 6 and the resulting arrangement is within the purview of my invention. It will likewise be recognized that while I have described a separate amplifier 9 as being used to produce the non-linear relationship between the output of pickup tube 6 and the image on the screen of kinescope 7, other arrangements known in the radio art for producing such a non-linear relationship, and for varying the range of intensity therein in which contrasts are emphasized, may be employed without departing from the scope of my invention.

I claim as my invention:

1. In an X-ray apparatus, means for producing an image on a fluorescent screen, an image intensifier for said image, an electric pickup device responsive to said image, a receiver adapted to reproduce a picture in response to the output of said pickup device and a connection from the output of said pickup device to the input of said receiver, said connection including a variable gain linear amplifier and a non-linear amplifier having within the range over which it operates an output which varies rapidly with input over a portion of the range of variation of said input but varies substantially less rapidly in parts of said range both above and below said portion.

2. In an X-ray apparatus, means for producing an image on a fluorescent screen, an electric pickup device responsive to said image, a receiver adapted to reproduce a picture in response to the output of said pickup device, and a connection from the output of said pickup device to the input of said receiver, said connection having a non-linear amplifier having within the range over which it operates an output which varies rapidly with input over a portion of the range of variation of said input but varies substantially less rapidly in parts of said range both above and below said portion, and means for varying at will the position within said range of the midpoint of said portion.

3. In an apparatus for producing an output picture which is a reproduction with increased contrasts of an input picture, means for transmitting through a communication channel a current modulated in accordance with the point to point variations of light intensity in said input picture, an electro-optical picture reproducing device capable of producing an output picture which varies from point to point in response to the output of said channel, a linear amplifier provided with means for adjusting its gain in said channel and a non-linear amplifier also in said channel having within the range over which it operates an output which varies rapidly with input over a portion of the range of variation of said input but varies substantially less rapidly in parts of said range both above and below said portion.

4. In an X-ray apparatus, means for producing an X-ray image on a fluorescent screen, an electric pickup device responsive to said image, a receiver adapted to reproduce a picture in response to the output of said pickup device, a connection from the output of said pickup device to the input of said receiver, said connection having a non-linear output which varies point to point in response to the output of said pickup device, and means for causing said connection to have within the limits of the output range over which it operates an output which varies rapidly with the input to said connection over a portion of the range of variation of said input, but varies substantially less rapidly in parts of said range both above and below said portion, and means for varying at will within said range the position of the midpoint of said portion.

5. In an X-ray apparatus, means for projecting an X-ray image on a fluorescent screen which is contiguous to a photoelectric screen, means to project electrons from said photoelectric screen into a phosphor output screen, a television pickup device responsive to said image, a television receiver adapted to reproduce a picture and a connection from the output of said pickup device to the input of said receiver, said connection including a variable gain linear amplifier and a nonlinear amplifier embodying an electron tube having a grid-voltage cutoff below which the plate current is zero, a range of grid-voltage wherein the plate current is substantially proportional to grid-voltage, and showing saturation effects above said range, said tube, in normal operation of said receiver in said apparatus, having a grid voltage range extending from substantially below said cutoff to substantially above said range, and means for varying the gain of said linear amplifier at will.

References Cited in the file of this patent

UNITED STATES PATENTS

| Number | Name | Date |
|---|---|---|
| 1,838,537 | Dauvillier | Dec. 29, 1931 |
| 2,158,853 | Coolidge | May 16, 1939 |
| 2,179,414 | Konkle | Nov. 7, 1939 |
| 2,198,479 | Langmuier | Apr. 23, 1940 |
| 2,219,113 | Ploke | Oct. 22, 1940 |
| 2,234,806 | Ploke | Mar. 11, 1941 |
| 2,247,512 | Lewis | July 1, 1941 |
| 2,255,691 | Wilson | Sept. 9, 1941 |
| 2,258,762 | Hickok | Oct. 14, 1941 |
| 2,269,570 | Wilson | Jan. 13, 1942 |
| 2,269,590 | Lewis | Jan. 13, 1942 |
| 2,307,209 | George | Jan. 5, 1943 |
| 2,319,712 | Williams | May 18, 1943 |
| 2,321,611 | Moynihan | June 15, 1943 |
| 2,326,907 | Wendt | Aug. 17, 1943 |
| 2,352,488 | Mayle | June 27, 1944 |
| 2,395,099 | Cage | Feb. 19, 1946 |
| 2,442,287 | Edwards | May 25, 1948 |
| 2,476,900 | Olson | July 19, 1949 |
| 2,525,832 | Sheldon | Oct. 17, 1950 |
| 2,555,424 | Sheldon | June 5, 1951 |

FOREIGN PATENTS

| Number | Country | Date |
|---|---|---|
| 315,362 | Great Britain | Feb. 12, 1931 |